United States Patent [19]

Chen

[11] Patent Number: 4,670,522

[45] Date of Patent: Jun. 2, 1987

[54] POLYMER BLENDS

[75] Inventor: Albert C. Chen, East Brunswick, N.J.

[73] Assignee: Union Camp Corporation, Wayne, N.J.

[21] Appl. No.: 811,078

[22] Filed: Dec. 18, 1985

[51] Int. Cl.[4] .................... C08L 77/08; C08L 67/02
[52] U.S. Cl. .................... 525/420.5; 525/408; 525/425
[58] Field of Search ............ 525/420.5, 425, 408

[56] References Cited

U.S. PATENT DOCUMENTS

| | | | |
|---|---|---|---|
| 4,014,957 | 3/1977 | Kirsch | 525/425 |
| 4,219,460 | 8/1980 | Donermeyer | 524/494 |
| 4,359,556 | 11/1982 | Lakshmanan | 525/420.5 |
| 4,379,887 | 4/1983 | Overbersh | 525/184 |
| 4,391,956 | 7/1983 | Scheetz | 525/425 |

Primary Examiner—John C. Bleutge
Assistant Examiner—Patricia Short
Attorney, Agent, or Firm—Joseph T. Eisele; Edward J. Sites

[57] ABSTRACT

Polyamide and poly(ester-amide) materials are melt-blended to give products having good flexibility at high and low temperatures. The blends are useful for potting, encapsulating, and adhesive applications.

5 Claims, No Drawings

POLYMER BLENDS

BACKGROUND OF THE INVENTION

1. Field of the Invention

The present invention relates to polyamide based resins prepared by blending polyamides with poly(etherester) for potting, encapsulating, and adhesive applications. Said polymer blends have good high temperature stability and excellent low temperature flexibility.

2. Brief Description of the Prior Art

High molecular weight, highly crystalline polyamides (nylons) are useful for molding a variety of products. These types of resins have been known to have excellent toughness, flexibility, impact resistance, and abrasion resistance. In applications where extra strength is required, these properties can be improved further, usually by blending with other materials. For example, improvements in impact strength has been achieved through the blending of alkyl acrylate elastomer into a polyamide as described in U.S. Pat. No. 3,984,497.

Polyamides are also useful as hot-melt adhesives. Dimerized fatty acids are the major diacid components in this type of resin. Such polyamides usually have relatively low molecular weights and ring-and-ball softening points in the range of 100°–200° C., depending on the level of co-diacids; for example, adipic, azelaic, sebacic, terphthalic, or other carboxylic acids in the composition. The properties of adhesive polyamides can also be improved by blending with other materials. For instance, the tear resistance of a polyamide has been improved by blending with elastomers as described in U.S. Pat. No. 3,546,319.

Special blending equipment to achieve the necessary compatibility of the polyamide component and other components is often required, commonly: a single screw extruder, double screw extruder, Brabender Plasticorder, or batch mixer, etc. Some examples of this requirement are the following. (a) Significant improvements in impact resistance have been achieved by blending polyamide molding resins, hydroxy functional elastomers, and succinic functionalized coupling agents. The blending process utilizes heat and shear to disperse the elastomer and cause coupling reactions of the components. A full description is contained in U.S. Pat. No. 4,320,213. (b) Blends of polyamides with olefin/acrylamide/alkyl methacrylate copolymers have been prepared in a single screw and double screw extruders at 250°–290° C. as described in U.S. Pat. No. 4,287,315. (c) Blends of polyamide with polyethylene or ethylenevinyl acetate copolymer can also be prepared, although preparation of these blends requires very vigorous kneading as described in German Auslegeschrift No. 1,138,922. (d) Nylon 66, acrylic resin, and styrene/maleic anhydride copolymer have been blended in single screw and in Brabender Plasti-corder as described in U.S. Pat. No. 4,320,213.

Additional examples describing the blending of polyamides with carboxyl-containing polyolefins are given in U.S. Pats. Nos. 3,373,223; 3,373,224; 4,035,438; and 4,132,690.

SUMMARY OF THE INVENTION

The invention relates to thermoplastic blends comprising from 50 to 95 percent of a polyamide based on dimerized fatty acid and commonly used as a hot-melt adhesive, and from 5 to 75 percent of a poly(ether-ester) elastomer commonly used as a molding compound. The products in this invention are obtained by melt-blending of the two components in ordinary laboratory reaction flasks or in reactors equipped with heating elements and stirring blades.

The resulting blends have adhesion to various substrates such as polyethylene, polyesters, polyamides, polyvinyl chloride, etc., and they possess low temperature elongation and flexibility. Upon re-heating, the blends shown no phase separation. They are therefore useful in hot-melt adhesive formulations.

These blends may be used as fillers or potting resins for electric connectors in which the space between the electric wiring and plastic casing must be completely filled. Said electric connectors may be used under the hoods of automobiles.

Other uses may include encapsulating electronic parts or circuit boards to seal the parts and protect them from the effects of oxygen, moisture, and other corrosive gases. It is also possible to seal the electric contacts with said polymer blends without using the customary metal flux and soldering.

DETAILED DESCRIPTION OF THE PREFERRED EMBODIMENT

The term "polyamides" or "polyamide resins" herein refers to polymers having recurring carboamide groups in the main chain having number-average molecular weights of greater than 2,000.

Polyamides are ordinarily produced by condensation polymerization of essentially equimolar amounts of dicarboxylic acids and diamines. The diacid components may be a combination of the following: dimerized fatty acids, aliphatic dicarboxylic acids (adipic, azelaic, sebacic, dodecanedioic acid, $C_{20}$ dicarboxylic acid, etc.), alicyclic dicarboxylic acids (1,4-cyclohexanedicarboxylic acid, etc.), or aromatic dicarboxylic acids (phthalic, isophthalic, terephthalic acid, etc.) The diamine components may be ethylenediamine, hexamethylenediamine, piperazine, and the like. Optionally, aminoacids (6-aminohexanoic, 12-aminododecanoic acid, etc.) or their lactams (caprolactam, laurolactam, etc.) may be incorporated into the polyamides.

The preferred polyamides used in the invention are hot-melt adhesives based on dimeric fatty acids such as Union Camp Corporation's Uni-Rez ® resins or their equivalents.

The poly(ether-ester) elastomers used in the blending are condensation polymers synthesized from essentially equimolecular amounts of dicarboxylic acids and diols. Among dicarboxylic acids, terephthalic acid and its dimethylester are preferred. The diols portion consists advantageously of two components: 1,4-butanediol and poly(1,4-butanediol). Typically, the dimethylterephthalate, 1,4-butanediol and poly(tetramethylene glycol) are reacted at 250° C. using tetrabutyltitanate as a catalyst. The resulting poly(ether-ester) contains hard segments poly(butylene terphthalate) and soft segments [poly(tetramethylene glycol)]. The number-average molecular weights are usually above 20,000. The glass transition temperatures are about −50° C., and melting points are about 200° C. The block type of elastomer has been commercialized by duPont under the tradename of Hytrel ®.

The blending of polyamide resins and poly(ether-ester) elastomers in this invention may be carried out in ordinary laboratory glassware equipped for heating and stirring or in simple pilot or plant reactors similarly equipped. The blending may be carried out in the presence of added anti-oxidants; for example, Irganox 1010 (product of Ciba-Geigy). No special mixing equipment, extruders, or other type of equipment is required. The blends are uniform and stay uniform with no phase separation upon cooling and re-heating.

The blends may contain 5 to 75 percent, preferably from 10 to 50 percent, of poly(ether-ester), the balance being a polyamide.

The ring-and-ball softening points of the blends are essentially identical to the softening points of the polyamides used up to about 50 percent by weight of poly(ether-ester). However, the viscosities of the blends are always higher than the viscosities of the polyamides used. This can be very beneficial in certain adhesive and encapsulation applications where high softening points and high viscosities of the polyamide blends will prevent the material from sagging or running.

The blends may be plasticized by plasticizers such as dialkyl phthalate or dialkyl adipate, etc. Such plasticized blends are useful where low viscosity and extra flexibility are desirable, for example, in potting compounds.

Blends of dimer fatty acid-based polyamides and poly(ether-ester) are strong materials. They have good tensile strength, elongation, and tensile modulus at room temperature and at $-40°$ C.

EXAMPLES

Example #1

Seventy-five parts of UniRez® 2642, a dimer fatty acid-based hot-melt polyamide made by Union Camp Corporation, 0.25 pars of Irganox 101 (product of Ciba-Geigy), and 0.25 parts of dilauryl thiodipropionate (product of Witco) were charged into a reactor equipped with a nitrogen inlet, a stirrer, and a thermocouple.

Heating was started under a slow $N_2$ sweep and the reactants stirred until the solid had completely melted. Twenty-five parts of a poly(ether-ester), duPont's Hytrel® 4056, was added in portions and the mixture was heated to 220° C. and stirred for an additional 5 hours. The product was then subjected to vacuum (3-5 mm) for 1 hour and then poured onto a Teflon lined pan. This product had a melting point of 160° C. and viscosity of 14,280 cps at 190° C. It also had a tensile strength of 830 psi, elongation of 140 percent, and tensile modulus of 1,700 psi.

Example #2

The procedure of Example 1 was repeated, this time with fifty parts of Uni-Rez® 2642 polyamide and fifty parts of Hytrel® 4056. The product blend had a melting point of 160° C., a viscosity of 12,340 cps at 190° C., a tensile strength of 690 psi, elongation of 110 percent, and tensile modulus of 10,700 psi.

Example #3

Seventy-five parts of Union Camp Corporation's UniRez® 2643 polyamide was blended with twenty-five parts of Hytrel® 4056 according to the procedure of Example 1. The polyamide of this example had a number average molecular weight of 5,500 and melting point (Ring and Ball Method) of 124° C. Its viscosity was 1,000 cps at 204° C., the acid number 0.7, and the amine number was 7.0. The product blend had a melting point of 130° C. and viscosity of 5,540 cps at 204° C.

Example #4

Fifty parts of the Uni-Rez® 2643 of Example 3 and fifty parts of Hytrel® 4056 were blended according to Example 1. The product had a melting point of 130° C. and vicosity of 9,920 cps at 204° C.

Example #5

Seventy-five parts of Union Camp Corporation's Uni-Rez® 2652 polyamide was blended with twenty-five parts of Hytrel® 4056 according to the procedure of Example 1. The polyamide of this example had an acid number of 1.0 and amine number of 5.0. Its melting point was 125° C. and viscosity was 3,700 cps at 204° C. Room temperature tensile strength was 460 psi, elongation was 790 percent, and tensile modulus was 12,360. At $-40°$ C., tensile strength was 3,200 psi, elongation was 170 percent, and tensile modulus was 66,950 psi. The blend had a melting point of 130° C. and viscosity of 22,250 cps at 204° C. Room temperature tensile strength was 280 psi, elongation was 110 percent, and tensile modulus was 10,520 psi. At $-40°$ C., tensile strength was 3,390 psi, elongation was 120 percent, and tensile modulus was 137,000 psi.

Example #6

Fifty parts of the Uni-Rez® 2652 of Example 5 and fifty parts of Hytrel® 4056 were blended according to the procedures of Example 1. The product blend had a melting point of 130° C. and visosity of 28,450 cps at 204° C. Its room temperature tensile strength was 400 psi, elongation was 120 percent, and tensile modulus was 7,850 psi. At $-40°$ C., tensile strength was 3,280 psi, elongation was 120 percent, and tensile modulus was 105,300 psi.

Example #7

Blends of Examples 1-6, Uni-Rez® 2642, Uni-Rez® 2643 and Uni-Rez® 2652 were each melted and poured into an electrical wiring casing approximately 2" deep and 1"×½" in cross-section and containing a bundle of about six wires in the center until the case was full, then allowed to solidify around the wires. Each sample was then warmed to about 125° C. and the wires flexed at an angle of 90° C. in all directions about one hundred times, then cooled to room temperature and inspected. The Uni-Rez® samples showed extensive cracking at the casing surface and had pulled away from the wires, leaving gaps between the resin and the wires about ⅛". The casings containing the polyamide blends as potting compound were virtually unchanged, exhibiting only slight separation from the wires.

What is claimed is:
1. A composition, which comprises; a blend of
   (a) polyamide which comprises the amidation product of a dimer fatty acid; with
   (b) a poly(ether-ester) elastomer, wherein the blend contains from about 5 to about 75 percent by weight of the poly(ether-ester) elastomer.
2. The composition, as described in claim 1, wherein the polyamides further comprise amidation products of from about 10 to about 100 equivalent-percent dimeric fatty acid, from about 0 to about 90 equivalent-percent co-diacid, and from about 95 to about 105 equivalent-percent diamine.
3. The composition of claim 2, wherein the polyamides have amidation products dimeric fatty acid content of from about 50 to about 100 equivalent-percent and a co-diacid content of from about 0 to about 50 percent equivalent-percent.

4. The composition of claim 3, wherein the co-diacid component of the amidation product contains from about 6 to about 20 carbon atoms.

5. The composition, as described in claim 2, wherein the diamine component of the amidation product is a mixture of a linear aliphatic diamine and piperazine.

* * * * *